(12) United States Patent
Miro et al.

(10) Patent No.: US 7,349,758 B2
(45) Date of Patent: Mar. 25, 2008

(54) INTERACTIVE PERSONALIZED ROBOT FOR HOME USE

(75) Inventors: Xavier Anguera Miro, Tarragona (ES); Roland Kuhn, Santa Barbara, CA (US); Luca Brayda, Moncalieri (IT)

(73) Assignee: Matsushita Electric Industrial Co., Ltd., Osaka (JP)

( * ) Notice: Subject to any disclaimer, the term of this patent is extended or adjusted under 35 U.S.C. 154(b) by 787 days.

(21) Appl. No.: 10/739,915

(22) Filed: Dec. 18, 2003

(65) Prior Publication Data
US 2005/0137747 A1 Jun. 23, 2005

(51) Int. Cl.
*G06F 19/00* (2006.01)

(52) U.S. Cl. ............... 700/245; 700/247; 700/248; 700/251; 700/257; 700/258; 318/568.11; 318/568.12; 318/568.13; 318/568.16; 318/568.21; 901/1; 901/2; 901/27

(58) Field of Classification Search ............ 700/245, 700/247, 248, 251, 257, 258, 259, 260, 261, 700/262, 264; 318/568.11, 568.12, 568.13, 318/568.16, 568.21, 568.25; 600/117, 118, 600/407, 426, 429, 587; 606/102, 130, 139; 901/1, 2, 27
See application file for complete search history.

(56) References Cited

U.S. PATENT DOCUMENTS

| 6,155,835 | A | * | 12/2000 | Shercliff ............... 434/118 |
| 6,347,261 | B1 | * | 2/2002 | Sakaue et al. ............... 700/245 |
| 6,415,257 | B1 | | 7/2002 | Junqua et al. |
| 6,553,345 | B1 | | 4/2003 | Kuhn et al. |
| 6,584,376 | B1 | * | 6/2003 | Van Kommer ............... 700/245 |
| 6,895,305 | B2 | * | 5/2005 | Lathan et al. ............... 700/245 |
| 7,127,497 | B2 | * | 10/2006 | Nonaka ............... 709/217 |
| 2002/0005787 | A1 | | 1/2002 | Gabai et al. |
| 2002/0072913 | A1 | | 6/2002 | Ten Brink |
| 2003/0109960 | A1 | | 6/2003 | Nourbakhsh et al. |

FOREIGN PATENT DOCUMENTS

EP 1079371 A1 2/2001
EP 1079615 A2 2/2001

OTHER PUBLICATIONS

Fai et al., Bluetooth enabled mobile robot, 2002, IEEE, p. 903-908.*
Socket, Socket's bluetooth strategy, The World Is Your Network, 2001, Internet, p. I-IV and 1-29.*
Thrum et al., Probabilistic algorithms and the interactive museum tour-guide robot minerva, 2000, Internet, p. 1-35.*
Ipina et al., An architecture for sentient GPRS=enabled microbots,2003, Internet, p. 1-6.*

* cited by examiner

*Primary Examiner*—Thomas Black
*Assistant Examiner*—McDieunel Marc
(74) *Attorney, Agent, or Firm*—Harness, Dickey & Pierce, PLC

(57) ABSTRACT

An interactive personalized robotic system for a home environment includes a home network in communication with at least one electronic device. A robot is in communication with the home network and is capable of controlling the at least one electronic device. The robot further includes a plurality of modules for personally communicating with a user. The user can control the robot and the at least one electronic device by communicating with the robot.

25 Claims, 2 Drawing Sheets

INTERACTIVE PERSONALIZED ROBOT FOR HOME USE

FIELD OF THE INVENTION

The present invention relates to monitoring and controlling a home environment, and more particularly, to an interactive personalized robot for home use to monitor and control the home environment.

BACKGROUND OF THE INVENTION

Considerable effort is currently being invested in the development of home networks. The typical home of today contains dozens of electrical devices, each controlled by means of a different interface located close to the device itself (e.g., light switch, refrigerator control knob, television remote control). There is an effort underway to make all these appliances controlled more remotely by infrared light or a wireless connection to the home network.

However, as the home network expands and encompasses more and more electronic devices, the need to monitor and control this home network (which in turn monitors and controls the home) becomes increasingly complex. Accordingly, it is an object of the present invention to provide the art with an interactive personalized robot capable of monitoring and controlling the home directly and through the home network.

SUMMARY OF THE INVENTION

An interactive personalized robotic system for a home environment includes a home network in communication with at least one electronic device. A robot is in communication with the home network and is capable of controlling the at least one electronic device. The robot further includes a plurality of modules for personally communicating with a user. The user can control the robot and the at least one electronic device by communicating with the robot.

FIG. 1 is an illustrative view of an interactive personalized robot constructed according to the principles of the present invention in an exemplary home environment; and FIG. 2 is a schematic view of the interactive personalized robot of the present invention in an exemplary home environment.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Figure 1:
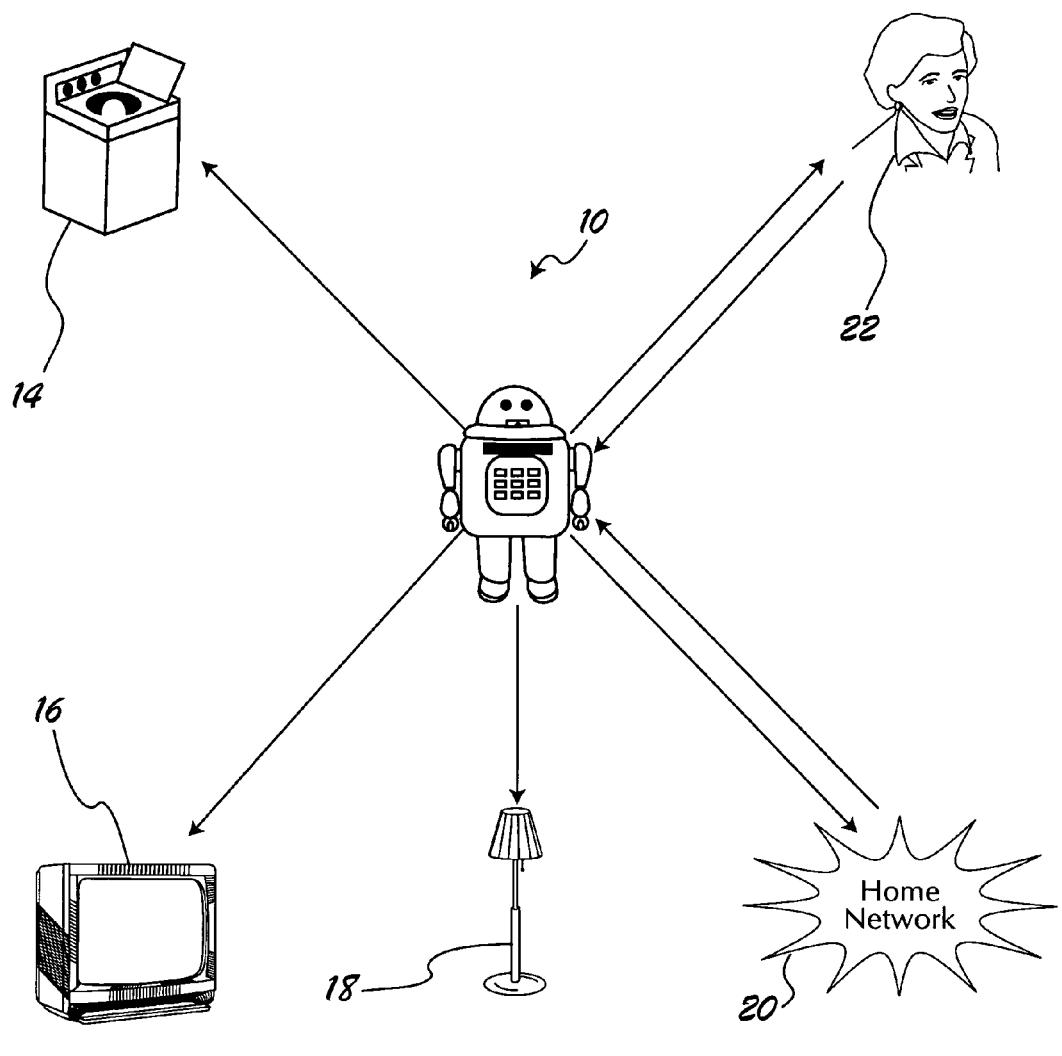
With reference to FIG. 1, an interactive personalized robot 10 is illustrated in an exemplary home environment 12. While in the particular description provided, the interactive personalized robot 10 is used in a personal home 12, it should be appreciated that the interactive personalized robot 10 may be used in other settings, including, but not limited to, an office building or manufacturing facility.

The home environment 12 typically includes a number of appliances, for example, a washing machine 14, a television 16 and a lamp 18. It should be appreciated that any number of other appliances may also be included. Each of the appliances 14, 16, 18 are in communication with the interactive personalized robot 10. As will be discussed in greater detail below, the interactive personalized robot 10 interacts with the appliances 14, 16, 18 to perform various functions.

The home environment 12 further includes a home network 20. The home network 20 is an electronic network of all the various electronic devices or appliances located within the home environment 12. While not specifically illustrated, these may include air conditioning units, furnaces, cameras, ovens, dishwashers, motion sensors, fire alarms, carbon monoxide detectors, light sources, personal computers and alarm systems, as well as entertainment devices such as televisions, DVD players, receivers and audio systems. The home network 20 essentially links all these devices to a single electronic source. The home network 20 is in direct communication with the interactive personalized robot 10. As will be described below, the interactive personalized robot 10 may access the home network 20, receiving information stored within the home network 20. In this regard, the home network 20 acts as an information data store capable of storing personalized preferences and settings for the user of the home environment 12.

The home environment 12 further includes users 22. These users 22 include any human being who enters the home environment 12. This includes the owners of the home environment 12, children, visitors, salesmen, repair people and even burglars. The interactive personalized robot 10, as will be described in greater detail below, interacts directly with the users 22.

Figure 2:
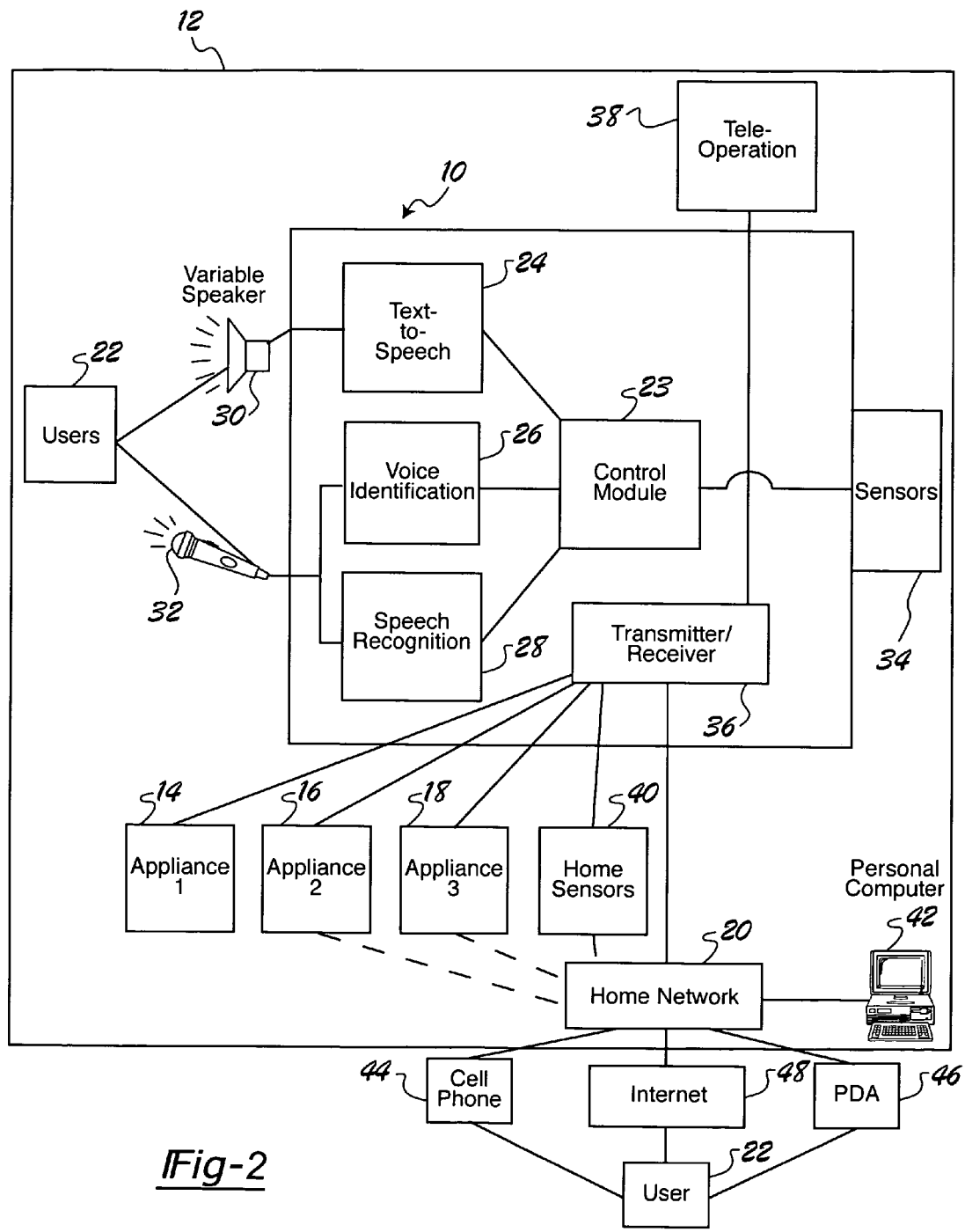

With reference to FIG. 2, the interactive personalized robot 10 generally includes a control module 23 that semi-autonomously controls the interactive personalized robot 10. The interactive personalized robot 10 also includes a text speech module 24, a voice identification/verification module 26 and a speech recognition module 28. These modules 24, 26, 28 are used to interact with the users 22 of the home environment 12.

The text-to-speech module 24 is connected to the control module 23 and generates synthesized speech which is transmitted to a variable speaker 30. The variable speaker 30 emits the synthesized speech to the users 22.

The voice identification/verification module 26 is connected to the control module 23 and to a variable microphone 32. The variable microphone 32 detects audible speech from the users 22 and transmits it to the voice identification/verification module 26. The voice identification/verification module 26 in turn identifies the users 22 using the voice identification software.

The speech recognition module 28 is connected to the control module 23 and also to the variable microphone 32. The speech recognition module 28 interprets audible speech sent by the users 22 and received by the variable microphone 32. The speech recognition module 28 uses speech recognition software to convert the audible speech to text recognizable by the control module 23.

In addition to the audible components, the interactive personalized robot 10 further includes a plurality of sensors 34 used to navigate the interactive personalized robot 10. These plurality of sensors 34 may include biometric sensors, GPS positioning sensors, cameras or radar. The plurality of sensors 34 are in turn linked to the control module 23.

The plurality of sensors 34 may also include a biometric sensor capable of sensing biometric data, such as, for example, facial identification/verification, fingerprint analysis, DNA sampling, etc. The biometric sensor can be used as a part of a security system in conjunction with the voice identification/verification module 26 to identify persons within the home environment as either known or unknown, as will be described below.

The interactive personalized robot 10 includes a transmitter/receiver 36. The transmitter/receiver 36 is used to electronically interact with various outside sources. These include the appliances 14, 16, 18 and the home network 20. Moreover, the transmitter/receiver 36 may be used to communicate with a teleoperator 38 capable of controlling the interactive personalized robot 10.

The home network 20 is preferably coupled to the appliances 14, 16, 18 as well as other electronic devices within the home environment 12. These include home sensors 40, a personal computer 42, a cell phone 44, a PDA 46 and the Internet 48. The cell phone 44, PDA 46 and the Internet 48 are all in communication with the users 22.

The interactive personalized robot 10 has the ability to obtain information about appliances 14, 16, 18 within the home environment 12 and is able to control them remotely. This may be done either directly or through the home network 20. In this way, the interactive personalized robot 10 always knows if the user 22 is using a particular appliance.

The interactive personalized robot 10 also has knowledge of the cyber environment (e.g., the location of digital information) of the home environment 12. For example, the interactive personalized robot 10 knows the location of work files of various types stored on computers and other digital devices located in the home environment 12, as well as which users 22 have authorization to access a particular digital file. Knowledge of the cyber environment of the home environment 12 may be read directly by communicating to the digital devices or preferably through the home network 20 in communication with personal computer 42 and any other digital device located within the home environment 12.

The interactive personalized robot 10 has direct access to the internet 48 through the home network 20. The interactive personalized robot 10 may choose to give the users 22 of the home environment 12 any information from the internet 48 that may be useful. For example, traffic conditions on a certain road or new email may be communicated to the user 22 via the text-to-speech module 24 and the variable speakers 30.

Using biometric techniques such as face recognition from the plurality of sensors 34 or voice identification using the voice identification/verification module 26, the interactive personalized robot 10 knows and recognizes all the users 22 located within the home environment 12 at any given time. Alternatively, biometric data may be combined with voice identification in order to more accurately identify the users 22 within the home environment 12. Both the voice identification/verification module 26 and the biometric sensors contain a set of profiles of known individuals. In this way, the interactive personalized robot 10 can either identify persons within the home environment 12 or track them as unknowns. Moreover, using the home sensors 40, the interactive personalized robot 10 may know the location of each of these users 22 within the home environment 12. When the interactive personalized robot 10 interacts with the users 22, various personalized information specific to the users 22 may be transferred to the home network 20 for storage. This allows the interactive personalized robot 10 to have personalized characteristics when interacting with any given user 22.

Moreover, this personalized information may be transferred to another robot using the home network 20. Additionally, the personalized information may be transferred from the home network 20 to the internet 48, thereby allowing a newly purchased interactive personalized robot 10 or any other robot located in a different location to obtain instantaneously all the personalized information available to the original interactive personalized robot 10. Using the personalized information, the interactive personalized robot 10 may demonstrate certain types of socially informed behavior. For example, the interactive personalized robot 10 may enter a room within the home environment 12, address a user 22 by name, carry out a dialogue with the user 22 based upon what is known about the user's 22 personalized information, and know what the user 22 is doing at the time (e.g., "sorry to interrupt you while you are watching TV, sir"). Such personalized information will be particularly helpful to people with disabilities. For example, when the interactive personalized robot 10 is talking to users 22 with hearing difficulties, the interactive personalized robot 10 may speak louder or give its feedback graphically (e.g., on a nearby television screen or on a display installed on the interactive personalized robot 10 itself). The interactive personalized robot 10 may also be aware of any user's 22 particular health conditions and may call for help when needed.

The interactive personalized robot 10 may be run either in an autonomous mode using the control module 23 or in a remote mode. In the remote mode, the interactive personalized robot 10 may be controlled by the cell phone 44, the PDA 46, the internet 48 or directly by a teleoperator 38. This allows the user 22 to move the interactive personalized robot 10 around the home environment 12 remotely to monitor the home environment 12. Moreover, the user 22 could "greet" visitors to the home environment 12 from a remote location using his or her own voice projected from the variable speakers 30.

The interactive personalized robot 10 may also serve a security function by monitoring which users 22 are within the home environment 12. Using the home sensors 40 or the plurality of sensors 34 located on the interactive personalized robot 10, the interactive personalized robot 10 may track down any individual located within the home environment 12. The interactive personalized robot 10 may then record the biometrics of the individual in an optimal way (e.g., photographing the individual from a good angle and broadcasting the photograph to the police department). In some cases, the interactive personalized robot 10 may be able to intercept individuals before they enter the home environment 12 (e.g., the interactive personalized robot 10 might challenge individuals on the path to the home environment 12 or lock all doors within the home environment 12 if the individual approaching is not recognized by the interactive personalized robot 10 using biometric sensors or voice identification/verification module 26). The interactive personalized robot 10 may further use the home network 20 to provide additional security by broadcasting instructions to an individual using home appliances, by locking down devices electronically or using the devices to drive the individual away (e.g., by making all audio output devices in the home environment 12 broadcast a siren noise at top volume).

Finally, the interactive personalized robot 10 may achieve optimum accuracy with the text-to-speech module 24, the voice identification/verification module 26 and the speech recognition module 28 by locating the user 22 with whom the interactive personalized robot 10 has been ordered to interact and positioning itself in front of the user 22 so that the speech recognition, voice identification and text-to-speech functions are at an optimum. This allows the interactive personalized robot 10 to move to an appropriate distance from the user 22 and use appropriate volume settings given the distance. Optimization is achieved by arraying the variable speaker 30 and variable microphone 32 such that they are "aimed" at the target user 22. This allows communication from the interactive personalized robot 10 to be maximally intelligible to the target user 22 while disturbing as little as possible any other users 22 located within the same room of the home environment 12. Simultaneously, communication from the target user 22 to the interactive personalized robot 10 will also be maximally intelligible, thereby preventing the need for the user 22 to repeat the communications in order to be understood by the interactive personalized robot 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An interactive robotic system for a home environment comprising:
    a home network in communication with at least one electronic device; and
    a robot in communication with said home network and capable of controlling said at least one electronic device, said robot further including a plurality of modules for personally communicating with a user;
    wherein said user can control said robot and said at least one electronic device by communicating with said robot; and
    wherein said robot further includes a text-to-speech module and a speaker linked to said text-to-speech module for emitting a synthesized voice from said robot for communicating with said user and said robot knows a location of said user relative to said robot and positions itself relative to said user so as to optimize emitting said synthesized voice to said user.

2. The interactive robotic system of claim 1, wherein said plurality of modules includes a voice identification/verification module for either matching a voice to one of a set of stored profiles or deciding that said voice does not match one of said set of stored profiles.

3. The interactive robotic system of claim 1, wherein said plurality of modules includes a voice identification/verification module and a biometric sensor each having a set of stored profiles, said voice identification/verification module and said biometric sensor either matching a voice and biometric data to one of a set of stored profiles or deciding that said voice and biometric data does not match one of said set of stored profiles.

4. The interactive robotic system of claim 1, wherein said plurality of modules includes a speech recognition module for understanding communication from said user.

5. The interactive robotic system of claim 4, wherein said robot further includes a microphone linked to said speech recognition module for receiving speech from said user.

6. The interactive robotic system of claim 5, wherein said robot knows a location of said user relative to said robot and positions itself relative to said user so as to optimize receiving said speech from said user.

7. The interactive robotic system of claim 1, wherein said robot is selectively controlled remotely by said user.

8. The interactive robotic system of claim 7, wherein said robot is selectively controlled remotely by said user using a cellular phone.

9. The interactive robotic system of claim 7, wherein said robot is selectively controlled remotely by said user using a PDA.

10. The interactive robotic system of claim 1, wherein said home network includes a data store having personalized information regarding said user.

11. The interactive robotic system of claim 10, wherein said robot communicates with said home network to obtain said personalized information when communicating with said user.

12. The interactive robotic system of claim 10, wherein said robot communicates with said home network to add and store said personalized information when communicating with said user.

13. An interactive robot for use in a home environment comprising:
    a control module for controlling the robot;
    a text-to-speech module in communication with said control module and a speaker for synthesizing speech;
    a speech recognition module in communication with said control module and a microphone for receiving and decoding speech; and
    wherein the robot knows a location of a user and optimizes said synthesized speech to said user and optimizes said received speech from said user.

14. The interactive robot of claim 13, wherein the robot optimizes said synthesized speech to said user and optimizes said received speech from said user by positioning itself relative to said user such that said user is at an optimum location relative to said speaker and said microphone.

15. The interactive robot of claim 13, wherein the robot optimizes said synthesized speech to said user and optimizes said received speech from said user by positioning said speaker and said microphone relative to said user such that said speaker and said microphone are aimed at said user.

16. The interactive robot of claim 13, further comprising an at least one sensor for determining a location of a user.

17. The interactive robot of claim 13, wherein the robot is in communication with an at least one sensor in a home network for determining a location of a user.

18. The interactive robot of claim 13, wherein said robot stores personalized data of said user and uses said personalized data to communicate with said user.

19. The interactive robot of claim 18, wherein said robot adjusts a volume of an audio output from said text-to-speech module based on said personalized data of said user.

20. An interactive robot for use in a home environment having a home network, the interactive personalized robot comprising:
    a control module for controlling the robot;
    a text-to-speech module in communication with said control module and a speaker for synthesizing speech;
    a speech recognition module in communication with said central processing unit and a microphone for receiving and decoding speech; and
    a transmitter/receiver in communication with the home network of the home environment;
    wherein the robot monitors and controls the home environment through the transmitter/receiver and reports problems to a user using said text-to-speech module and said transmitter/receiver; and
    wherein the robot monitors an electronic device within the home environment and said control module runs diagnostics on the electronic device to determine if the electronic device is working and to alert said user.

21. The interactive robot of claim 20, further including a plurality of sensors used to monitor the home environment.

22. The interactive robot of claim 21, wherein said plurality of sensors includes a camera, and the robot monitors the home environment by using said camera to examine the home environment.

23. An interactive robotic system for a home environment comprising:
   a home network in communication with at least one electronic device; and
   a robot in communication with said home network and capable of controlling said at least one electronic device, said robot further including a plurality of modules for personally communicating with a user; wherein said user can control said robot and said at least one electronic device by communicating with said robot; and
   wherein said robot further includes a speech recognition module for understanding communication from said user and a microphone linked to said speech recognition module for receiving speech from said user, and said robot knows a location of said user relative to said robot and positions itself relative to said user so as to optimize receiving said speech from said user.

24. The interactive robotic system of claim 23, wherein said plurality of modules includes a voice identification/verification module for either matching a voice to one of a set of stored profiles or deciding that said voice does not match one of said set of stored profiles.

25. The interactive robotic system of claim 23, wherein said plurality of modules includes a voice identification/verification module and a biometric sensor each having a set of stored profiles, said voice identification/verification module and said biometric sensor either matching a voice and biometric data to one of a set of stored profiles or deciding that said voice and biometric data does not match one of said set of stored profiles.

* * * * *